United States Patent [19]

Tomita et al.

[11] Patent Number: 5,619,266

[45] Date of Patent: Apr. 8, 1997

[54] LIQUID CRYSTAL SHUTTER CONTROL CIRCUIT FOR A VIDEO CAMERA HAVING A SYNCHRONIZED STROBE FLASH

[75] Inventors: Seijiro Tomita; Takashige Nabeshima, both of Tokyo, Japan

[73] Assignees: Sony Corporation; Sony/Tektronix Corporation, both of Tokyo, Japan

[21] Appl. No.: 377,044

[22] Filed: Jan. 23, 1995

[30] Foreign Application Priority Data

Jan. 25, 1994 [JP] Japan .................................. 6-006659

[51] Int. Cl.[6] ................................................ H04N 5/238
[52] U.S. Cl. .......................... 348/363; 348/221; 348/371; 396/457
[58] Field of Search ................... 359/36, 39, 40, 359/84, 85, 275; 345/87, 98, 99, 100; 348/220, 221, 362, 363, 364, 365, 366, 370, 371; 384/226, 227.1; H04N 5/238

[56] References Cited

U.S. PATENT DOCUMENTS

| | | | |
|---|---|---|---|
| 3,577,153 | 5/1971 | Yagi | 178/7.2 |
| 3,881,808 | 5/1975 | Gurtler et al. | 350/160 LC |
| 3,890,628 | 6/1975 | Gurtler | 354/227 |
| 4,686,572 | 8/1987 | Takatsu | 358/213.13 |
| 4,734,777 | 3/1988 | Okino et al. | 358/228 |
| 4,788,565 | 11/1988 | Masuda et al. | 354/75 |
| 4,803,550 | 2/1989 | Yabe et al. | 358/98 |
| 4,837,628 | 6/1989 | Sasaki | 358/209 |

OTHER PUBLICATIONS

"New LC/CRT field-sequential color display", R.S. Vatne and P.A. Johnson Jr. and P.J. Bos, Proceedings of the SID, vol. 25/1, 1984, pp. 31–34.

Primary Examiner—John K. Peng
Assistant Examiner—Ngoc-Yen Vu
Attorney, Agent, or Firm—Jay H. Maioli

[57] ABSTRACT

A liquid crystal shutter, mounted on the side of a lens in a video camera, includes a pair of polarizing filters with a liquid crystal cell between them. A pulse generator generates a pulse for a predetermined length of time that is synchronized with a vertical synchronizing signal of a television signal. A controller controls an electrical field of the liquid crystal shutter to allow light from an object to be transmitted through the liquid crystal shutter in response to the pulse. Such liquid crystal shutter, having no mechanical moving parts, is much more durable than a mechanical shutter and can be easily maintained. In addition, the shutter apparatus, because it is controlled electrically, can work at high speed and can be easily synchronized with other systems.

5 Claims, 4 Drawing Sheets

LIQUID CRYSTAL SHUTTER CONTROL CIRCUIT FOR A VIDEO CAMERA HAVING A SYNCHRONIZED STROBE FLASH

BACKGROUND OF THE INVENTION

The present invention relates to an electric shutter control apparatus for a video camera using a liquid crystal shutter.

An image pick-up device such as a charge coupled device (CCD) in the video camera receives light transmitted from an object through a lens. The video camera generates a television signal by adding synchronizing signals which are synchronized with the vertical and horizontal synchronizing signals of a television signal to an electric signal supplied from the image pick-up device. To provide one video image in interlaced scanning for the television signal, time for two fields (one frame) is needed because the two fields are equivalent to one frame. When the object to be videoed is moving at high speed, the reproduced video image is distorted by a change of light from the image on the image pick-up device during one frame. Particularly in the interlaced scanning, the reproduced video image becomes indistinct due to a time lag of about one field between the two neighboring interlacing lines.

In order to provide a more distinct image of an object moving at high speed, the video camera is equipped with a shutter on its lens opening which opens at a predetermined time on the frame basis, and exposes the image pick-up device instantaneously to light from the object. However, the timing of the shutter opening is unstable and the synchronization with another system is difficult when using the shutter a mechanical structure as in the prior art. In addition, there is a problem with durability. If the video camera has no frequently moving mechanical structure other than such shutter, the timing of maintenance, inspection and repair will be determined by the shutter as the other parts all have long lives. Mechanism such as the shutter often cause trouble because of deterioration over time.

To solve this problem, it is disclosed in Japanese Patent Application Un-examined Publication No. 296866/1989 that a liquid crystal shutter can be used in place of a mechanical shutter. However, a means for synchronizing the operation of the video camera with an external system such as a strobe light on the object to be videoed is not disclosed in this invention, and therefore it is impractical to combine the liquid crystal shutter with the external system.

SUMMARY OF THE INVENTION

It is accordingly an object of the invention to provide an improved electric shutter for a video camera which can be easily synchronized with other systems and which is more durable and easily maintained.

In one aspect of the present invention, an electric shutter for a video camera has two polarizing filters with different polarizing angles and a liquid crystal cell between them. A pulse generating means, which is synchronized with a vertical synchronizing signal from a television signal, generates a pulse for a predetermined period. A controller controls the electrical field of the liquid crystal shutter, which allows light from an object to be transmitted through the liquid crystal shutter in accordance with the pulse.

The polarizing angles of these polarizing filters are set at 90° angles from each other. The liquid crystal cell allows light to be transmitted through the filters without any rotation when the electric field is applied to the liquid crystal cell. Because light is transmitted through the first polarizing filter and through the liquid crystal cell as is, its transmission is inhibited by the second polarizing filter. In such case the shutter is in the "OFF" (closed) state. On the other hand, when the electric field is not applied to the liquid crystal cell, light, which is rotated through 90° angle by the liquid crystal cell, is allowed to pass through the first polarizing filter through the second polarizing filter. In this case the shutter is in the "ON" (open) state.

The liquid crystal shutter, having no mechanical movable parts, is much more durable than a mechanical shutter and is easily maintained. In addition, it can be easily synchronized with other systems, is controlled electrically and works at high speed.

Additional objects and advantages of the present invention will be apparent from the following detailed description of a preferred embodiment thereof which is best understood with reference to the accompanying drawings.

DETAILED DESCRIPTION OF THE PREFERRED EMBODIMENT

Figure 1:
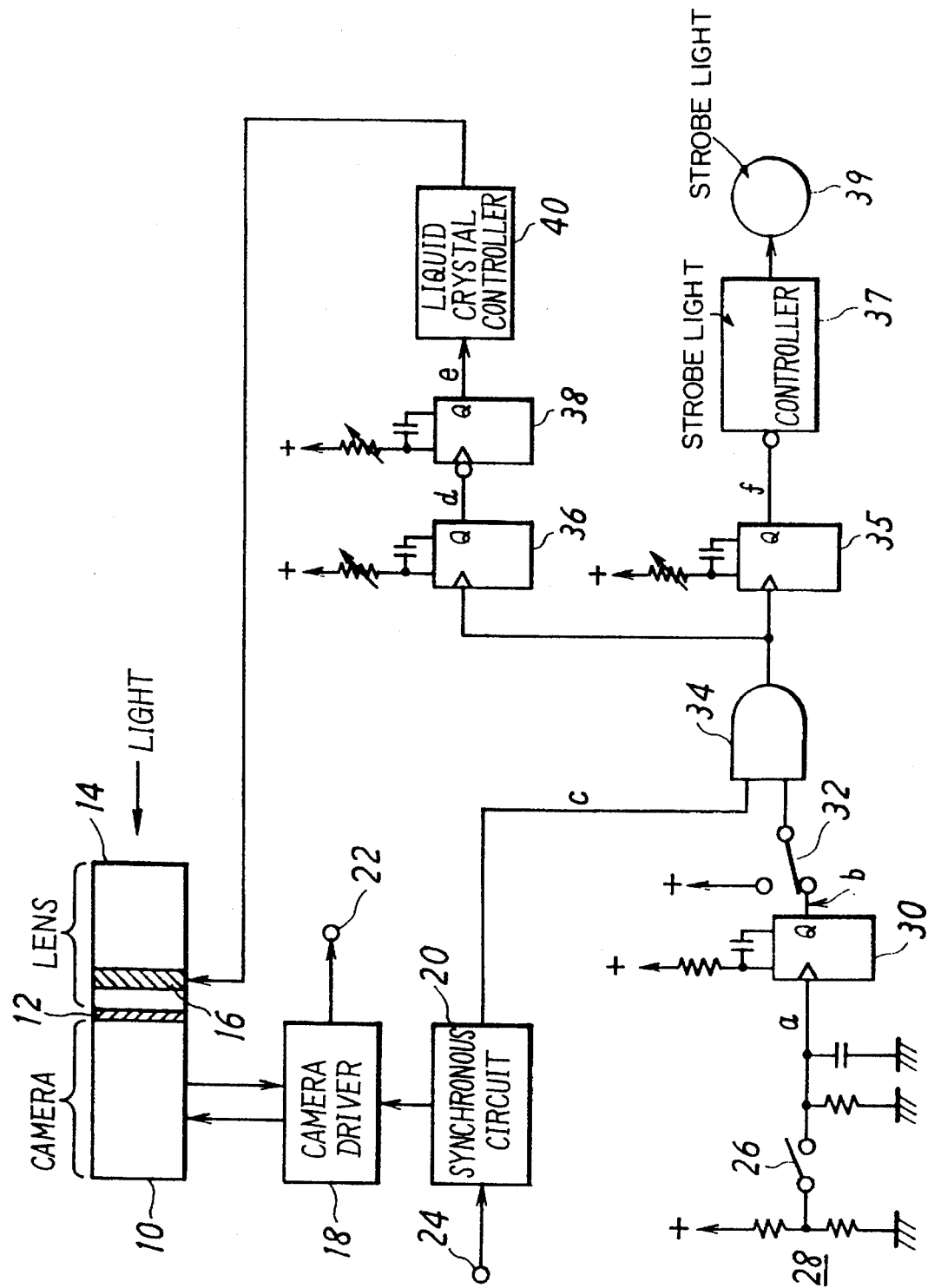
FIG. 1 illustrates, in block diagram form, a preferred embodiment in accordance with the present invention.
Figure 2:
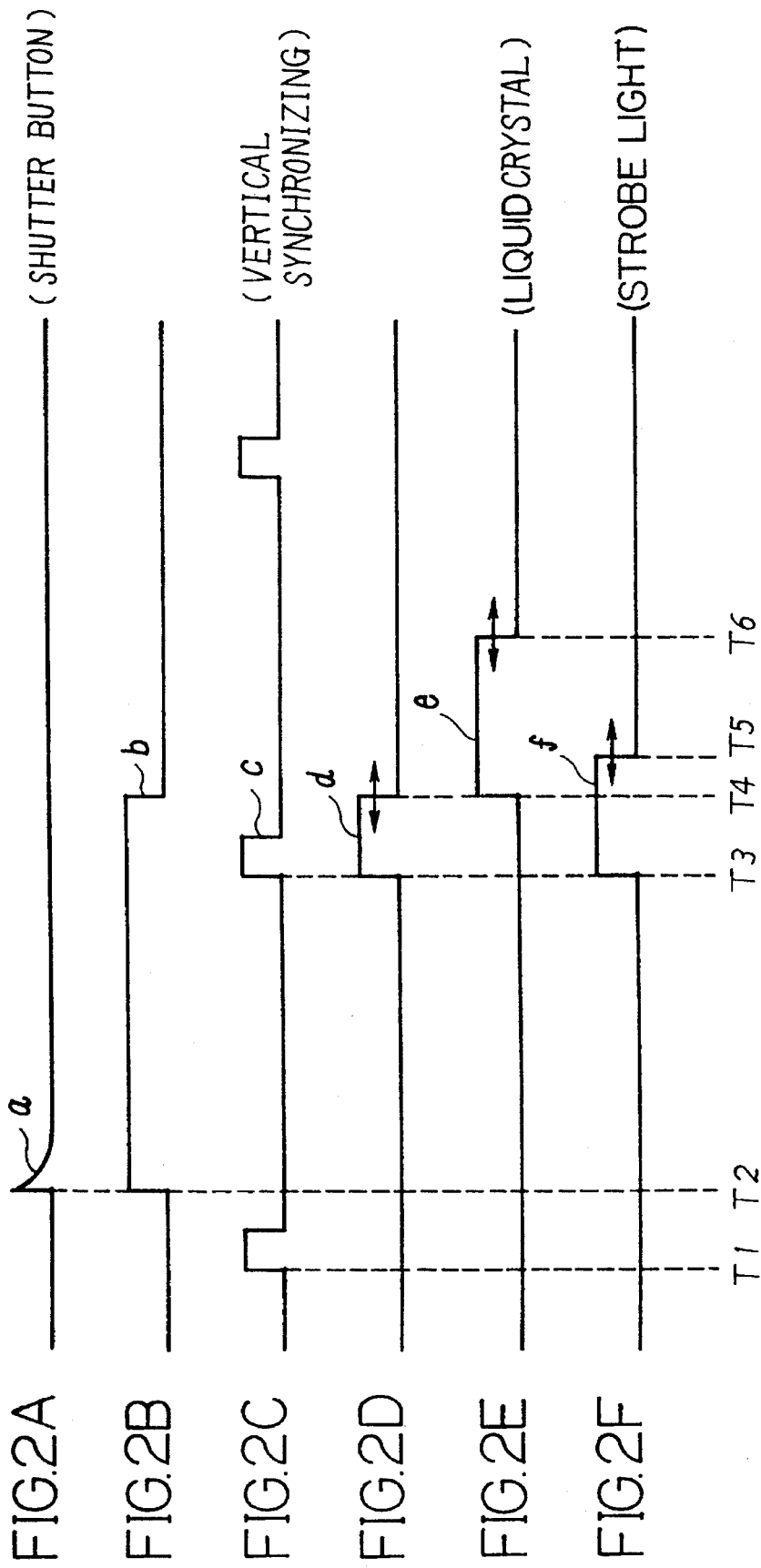
FIG. 2A to 2F are waveform charts for explaining an operation of the embodiment.

FIG. 1 illustrates, in block diagram form, a preferred embodiment according to the present invention. Light receiving block in a video camera 10 with an image pick-up device such as a CCD has a lens 14 mounted by a lens mounter 12. A light from an object is focused on the image pick-up device by the lens 14, inside which a liquid crystal shutter 16 is mounted. The liquid crystal shutter 16 is comprised of two polarizing filters 82 and 42 (shown in FIG. 3) which have different polarizing angles from each other and a liquid crystal cell 54 (shown in FIG. 3) arranged between them. The detail of the crystal liquid shutter 16 will be described later.

A camera driver 18 extracts an electric signal corresponding to the image received from the image pick-up device in the camera 10, and adds a synchronizing signal to the electric signal, thereby generating a television signal at an output terminal 22. A synchronous circuit 20, which is synchronized with an external synchronizing signal supplied as input at a terminal 24, supplies a vertical and horizontal synchronizing signal to the camera driver 18 independently of the external device and generates a frame signal (or a vertical synchronizing signal for a first field). A shutter switch 26 supplies a control voltage from a voltage divider 28 selectively to a clock terminal of a single-shot multivibrator 30, while a mode switch 32 selects either an output signal from the single-shot multivibrator 30 or a positive voltage (+). An AND gate 34, receiving the frame signal from the synchronous circuit 20 and the output signal from the switch 32, supplies a logical multiplier of these signals to clock terminals of single-shot multivibrators 35 and 36. The output signal of the single-shot multivibrator 36 is supplied to a clock terminal of the single-shot multivibrator 38.

Since such single-shot multivibrators 35, 36 and 38 have variable resistors in the time constant circuits, of which time constants are variable and therefore the length of time of the output pulse can be adjusted. As shown in FIG. 1, the single-shot multivibrators 35 and 36 are clocked by the rise in level of the clock signal while the single-shot multivibrator 38 is clocked by the drop in level of the clock signal. The output pulse from the multivibrator 38 is supplied as an input to a liquid crystal controller (control means) 40 so as to switch the liquid crystal shutter 16 to the "ON" or "OFF" state. The single-shot multivibrators 35, and 36 and 38, which constitute the pulse generating means, are synchronized with the vertical synchronizing signal of the television signal, and generate a pulse having a predetermined length of time. A strobe light controller 37 directs a strobe light to produce light, triggered by the drop in level of the output pulse from the single-shot multivibrator 35.

FIG. 2A to 2F illustrate the waveforms of FIG. 1. Waveform a is an output voltage from the switch 26, waveform b is an output voltage from the single-shot multivibrator 30, waveform c is a frame signal voltage from the synchronous circuit 20, and waveform d is an output voltage from the single-shot multivibrator 36. Waveform e is an output voltage from the single-shot multivibrator 38, and waveform f is an output voltage from the single-shot multivibrator 35. The frame signal c is generated on a frame basis, for example, at points T1, T3 and so on. If an operator switches the shutter switch 26 to the "ON" state when the mode switch 32 is switched to the single-shot multivibrator 30, a switch signal a is generated.

The single-shot multivibrator 30 is clocked by the signal a, thereby generating the output signal b. This output signal b has a predetermined length of time corresponding to one frame, and the shutter is switched by the frame signal next so that the shutter switch 26 is switched to the "ON" state. Because the AND gate 34 allows the frame signal c to be transmitted through when the output signal b from the single-shot multivibrator 30 is high, the single-shot multivibrator 36 generates an output pulse d at the point T3. The period of the output pulse d between T3 and T4 is variable. The single-shot multivibrator 38, which is clocked at the point T4, corresponding to the drop in level of the output pulse d, generates the output pulse e the length of time for which is variable. It is accordingly possible to control the points at which the output pulse e rises and falls in accordance with the frame signal c.

The liquid crystal controller 40 turns the liquid crystal shutter 16 on by providing an electric field to the shutter 16 during a certain period in accordance with the output pulse e. Thus, when the shutter switch 26 is turned on, the liquid crystal shutter 16 stays in the "ON" state for a length of time which is determined by the time constant of the single-shot multivibrator 38. It is accordingly possible to provide a distinct still picture even when the object to be videoed is moving quite fast.

When the mode switch 32 is switched to a high level, the liquid crystal shutter 16 is turned on because the single-shot multivibrator 36 is clocked on the basis of the frame signal c. It is accordingly also possible to provide a distinct moving picture even when the object to be videoed is moving quite fast.

Whatever the mode switch 32 is switched to, the time constant of the single-shot multivibrator 36 and 38 is adjusted in accordance with the luminous intensity of the image to be videoed. In the adjusting operation, the exposure time of the image pick-up device in the camera 10 is lengthened by increasing the time constant when it is darker, and the exposure time is shortened by reducing the time constant when it is brighter. If the single-shot multivibrators 35 and the strobe light controller 37 are synchronized with the frame signal and an object is lighted by the strobe light, the exposure time for which the shutter 16 is opened is shortened, thereby enabling the image of an object which is moving at a higher speed to be taken. The timings of the strobe light and of the opening of the shutter are controlled by adjusting the relation between the time constants of the single-shot multivibrators 36, 38 and 35.

Figure 3:
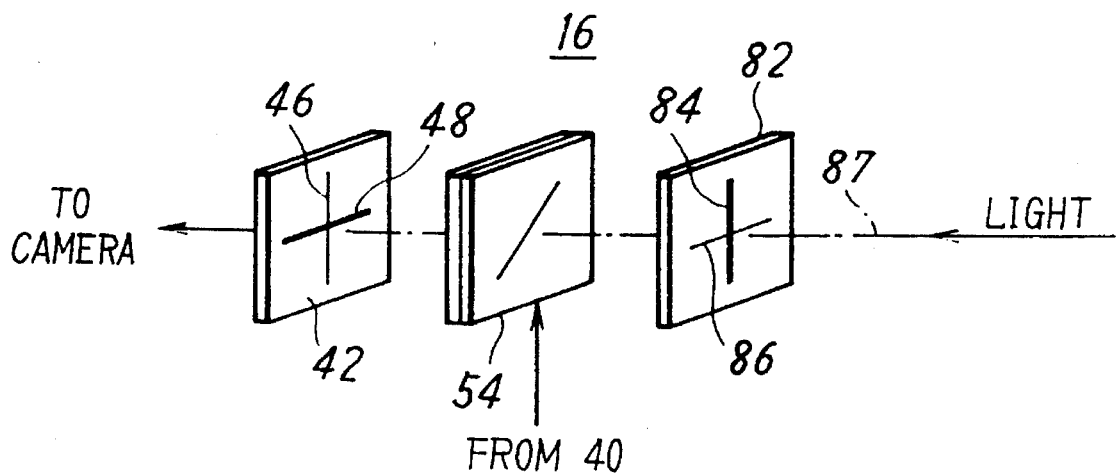
FIG. 3 is a diagram for explaining the structure of a liquid crystal shutter.

Such liquid crystal shutter 16 is much more durable than a mechanical shutter because it has no mechanical moving parts. FIG. 3 illustrates a model of such shutter 16. The liquid crystal shutter 16 has first and second polarizing filters 82 and 42, for which polarizing angles are set at 90° apart. In other words, the second polarizing filter 42 has a vertical transmission axis 46 and a horizontal absorption axis 48, and the first polarizing filter 82 has a vertical absorption axis 84 and a horizontal transmission axis 86.

The liquid crystal cell 54 works as a variable optical retarder, which allows light 87 to be transmitted through without any rotation when an electric field is applied to it. Because light 87 passing through the first polarizing filter 82 is transmitted through the liquid crystal cell 54 as is, its transmission is inhibited by the second polarizing filter 42, and the shutter 16 is in the "OFF" state. On the other hand, when an electric field is not applied to the liquid crystal cell 54, light 87 passing through the first polarizing filter 82, is rotated by 90° by the liquid crystal cell 54, and can be transmitted through the second polarizing filter 42 as well. In this case the shutter is in the "ON" state.

Figure 4:
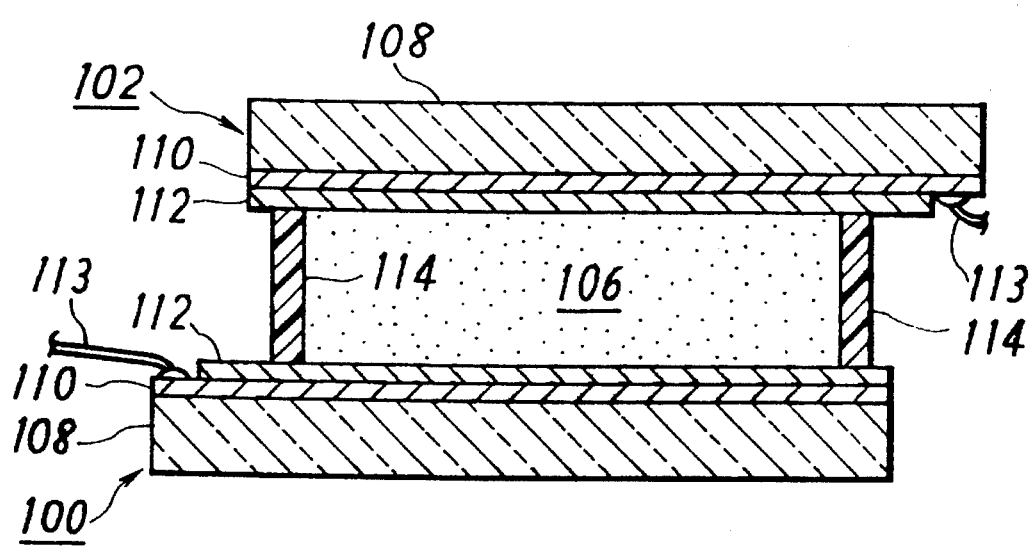
FIG. 4 is a diagram for explaining the structure of a liquid crystal cell.

FIG. 4 is a cross-sectional view of the liquid crystal cell 54, of which the thickness is magnified. A nematic liquid crystal material 106 is held between transparent electrode structures 100, 102 and spacers 114. Each of the electrode structures 100 and 102 is comprised of a glass substrate 108, a director alignment film layer 112 and a conductive layer 110. The control voltage from the liquid crystal controller 40 is applied to the conductive layer 110 through a conductor 113.

Figure 5:
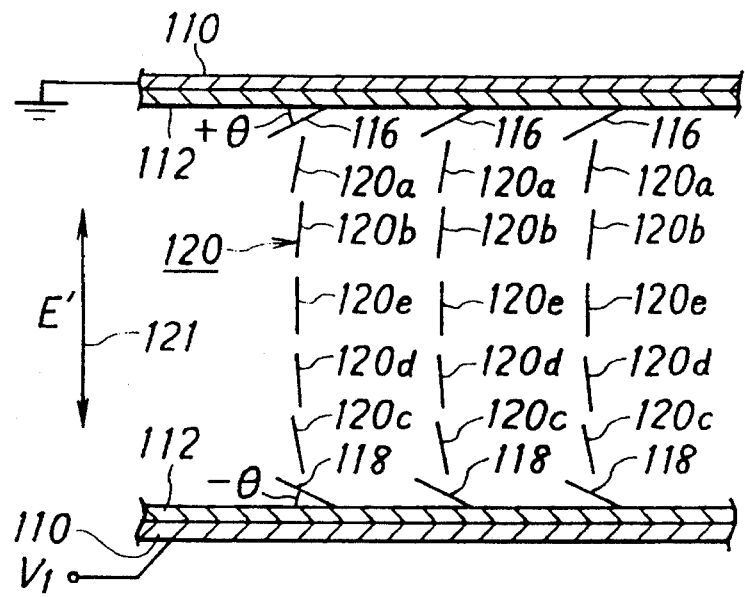
FIG. 5 is a diagram for explaining the operation of the liquid crystal cell in the "OFF" state.

FIG. 5 depicts the liquid crystal cell 54 to which an alternating electric field E' is produced by an electric potential difference (alternating voltage) V1 applied between the conductive layers 110. Most of surface noncontacting directors 120 (120a to 120e) in the liquid crystal material 106, having a positive directional characteristic, are aligned into an end-to-end alignment in the direction of the electric line of force 121 perpendicularly to the surface of the electrode structures 100 and 102. Light passing through the liquid crystal cell 54 is allowed to be transmitted through as is. Thus, the liquid crystal shutter 16 is turned to the "OFF" state. Whether the electric potential difference is applied or not, the surface contacting directors 116 and 118 substantially maintain their tilt bias angles +θ and −θ.

Figure 6:
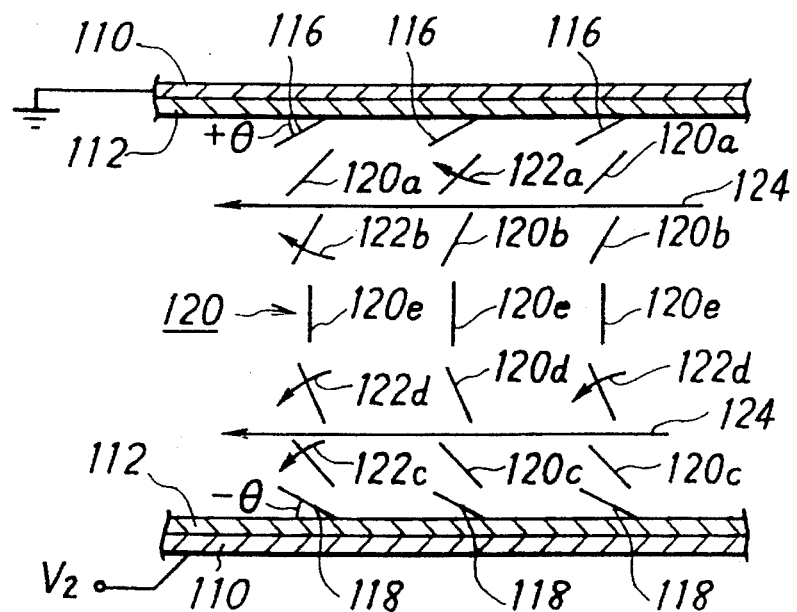
FIG. 6 is a diagram for explaining the operation of the liquid crystal cell in the "ON" state.

FIG. 6 depicts the liquid crystal cell 54 shown in FIG. 4, where the electric potential difference is removed from between the conductive layers 110. Such state is expressed in accordance with V2≈0. The surface noncontacting directors 120 are rotated along the direction indicated by arrows 120a and 122b to refract transmitting the light being transmitted. Thus, the crystal shutter 16 is turned to the "ON" state. In FIG. 6, the arrows 124 indicate the orientational direction of liquid crystal. Such liquid crystal is called a π cell, which was disclosed in Japanese Patent Application Un-examined Publication No. 196728/1985.

While the preferred embodiment of this invention has been described above, obviously modifications and variations are possible within the scope of this invention. Although the first and second polarizing filters 42 and 82 are at 90° angles from each other, it is feasible to set the filters at the same angle. In this case, when the electric field is applied, the liquid crystal cell 54 allows light to be transmitted as is. In other words, light through the first polarizing filter 42 can be transmitted through the liquid crystal cell 54 and the second polarizing filter 82 as well, in which case, the shutter 18 would be turned "on". On the other hand, when no electric field is applied, light is rotated by 90° through the first polarizing filter 42 and prevented from being transmitted in the second polarizing filter, in which case, the shutter 18 is turned "off". In addition, it is feasible to mount the liquid crystal shutter 16 outside the lens 14, in the middle of the lens 14, on the side of the camera 10, or on the opposite side of the camera 10. The period for which the liquid crystal shutter 16 is "on" can be also controlled by programmable counters other than the multivibrator. In such case, the programmable counter starts counting when the AND gate 34 outputs the signal, and continues outputting the pulse.

As described above, the liquid crystal shutter is comprised of a liquid crystal cell, and two polarizing filters. Such liquid crystal shutter, having no mechanical moving parts, is much more durable than a mechanical shutter and can be easily maintained. In addition, the shutter works at high speed and can be easily synchronized with other systems because it is controlled electrically.

It will be obvious to those having skill in the art that many changes may be made in the above-described details of the preferred embodiment of the present invention. The scope of the present invention, therefore, should be determined by the following claims.

What is claimed is:

1. An electric shutter control apparatus for a video camera with an image pick-up device, for controlling the exposure time of light from an object onto said image pick-up device, said apparatus comprising:

a lens system for said video camera arranged in front of said image pick-up device;

first and second polarizing filter means with different respective polarizing angles arranged between said lens system and said image pick-up device;

a liquid crystal device having a control terminal, arranged between said first and second polarized filter means;

a synchronous circuit receiving an external synchronizing signal and producing therefrom a vertical synchronizing signal;

first pulse generating means receiving said vertical synchronizing signal for generating a first pulse synchronized with said vertical synchronizing signal, said first pulse having a predetermined length of time;

liquid crystal device control means receiving said first pulse for generating a signal for controlling an electrical field of said liquid crystal device to place said device in an ON state and allow the light from the object to be transmitted through said first and second polarizing filter means and said liquid crystal device for said predetermined length of time of said first pulse;

second pulse generating means having an input connected to be triggered by said first pulse for generating a second pulse synchronized with said first pulse and with said vertical synchronizing signal; and external apparatus means receiving said second pulse for producing a light flash in response to said second pulse;

wherein said first pulse generating means comprises:
first multivibrator means for generating a shutter pulse in response to an operation of a shutter switch; and
gate means for gating said vertical synchronizing signal during the time said shutter pulse is generated and producing said first pulse; and said liquid crystal device control means comprises:
second multivibrator means for generating an output pulse having a predetermined length of time in response to said first pulse from said gate means; and
third multivibrator means for generating said signal for controlling an electric field of said liquid crystal device in response to said output pulse from said second multivibrator means.

2. The shutter control apparatus according to claim 1, wherein said external apparatus includes a strobe light for irradiating light at the object.

3. The shutter control apparatus according to claim 1, wherein said first pulse generating means has mode selecting means for selecting either a still picture mode where said first pulse generating means generates said first pulse in response to an operation of a shutter switch, or a moving picture mode where said first pulse generating means generates said first pulse in response to said vertical synchronizing signal.

4. The shutter control apparatus according to claim 1, wherein said liquid crystal device is a π cell.

5. The shutter control apparatus according to claim 1, wherein said external apparatus comprises a strobe light and strobe light control means for for controlling strobe light to irradiate light in response to said second pulse from said second pulse generating means.

* * * * *